R. J. BURROWS.
AXLE FOR MOTOR VEHICLES.
APPLICATION FILED AUG. 31, 1914.
1,291,761.
Patented Jan. 21, 1919.
3 SHEETS—SHEET 1.
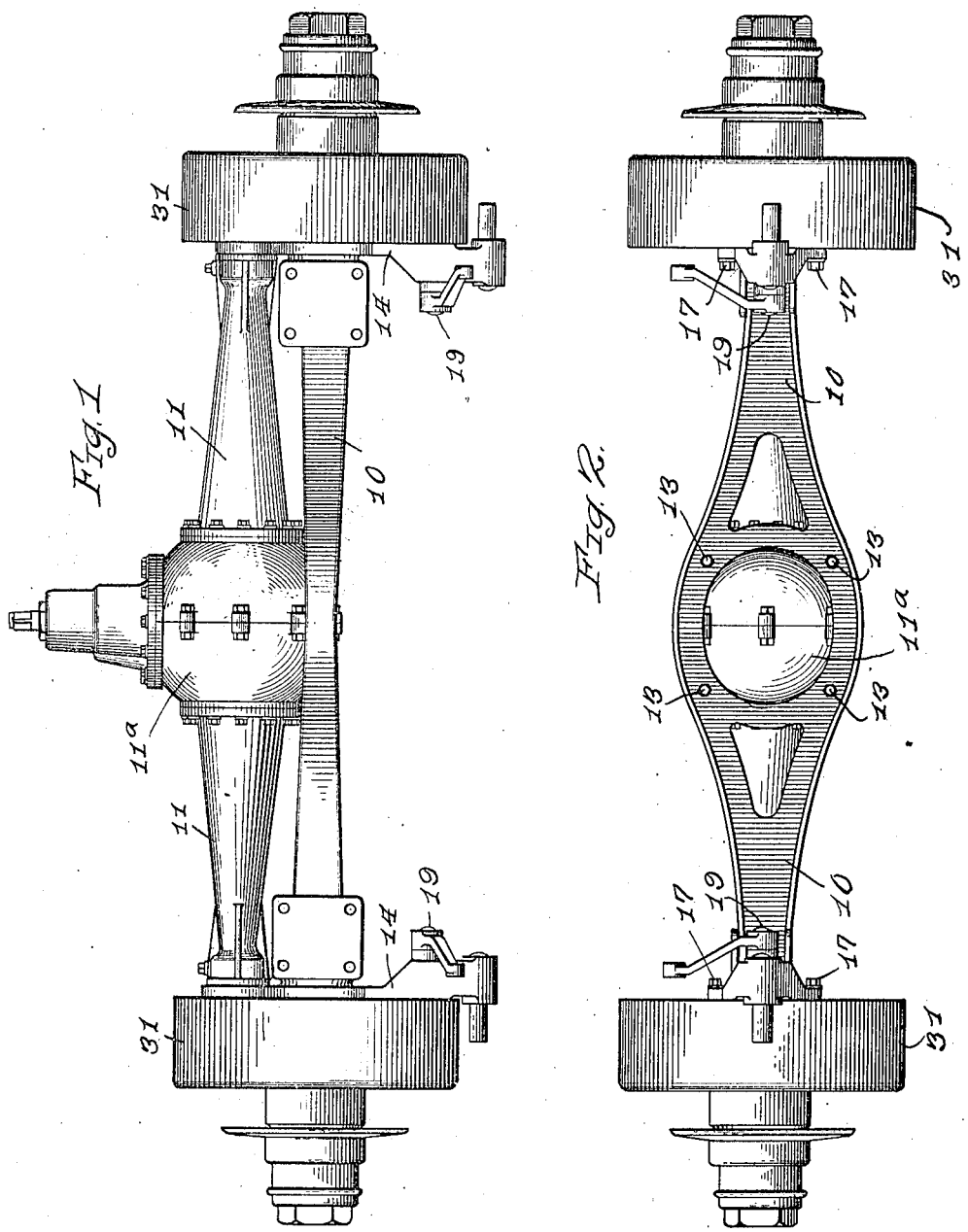
Witnesses:
L. B. Graham
W. A. Furnner
Inventor:
Robert J. Burrows
By Adams & Jackson
Attys.

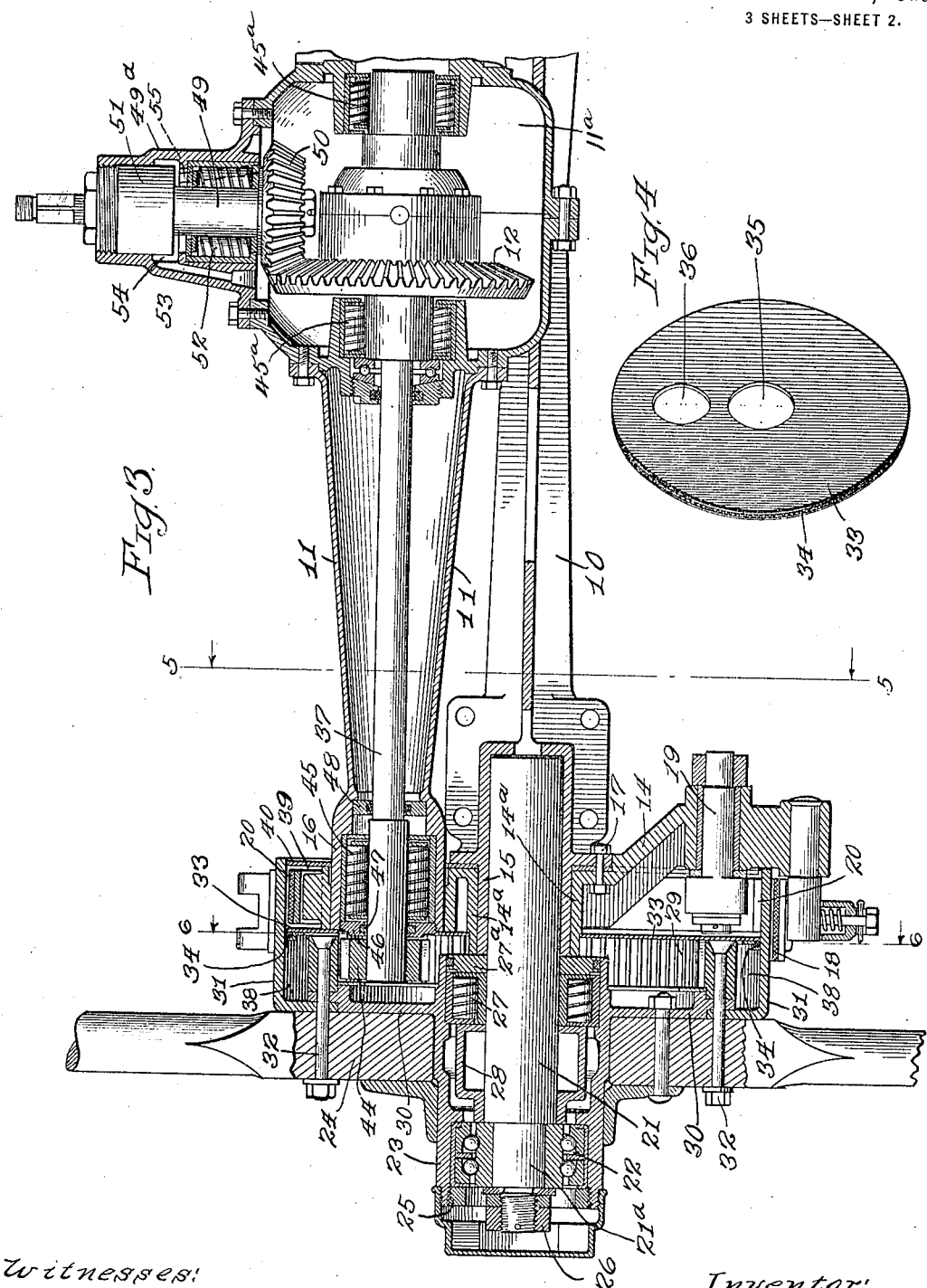

R. J. BURROWS.
AXLE FOR MOTOR VEHICLES.
APPLICATION FILED AUG. 31, 1914.
1,291,761.
Patented Jan. 21, 1919.
3 SHEETS—SHEET 3.
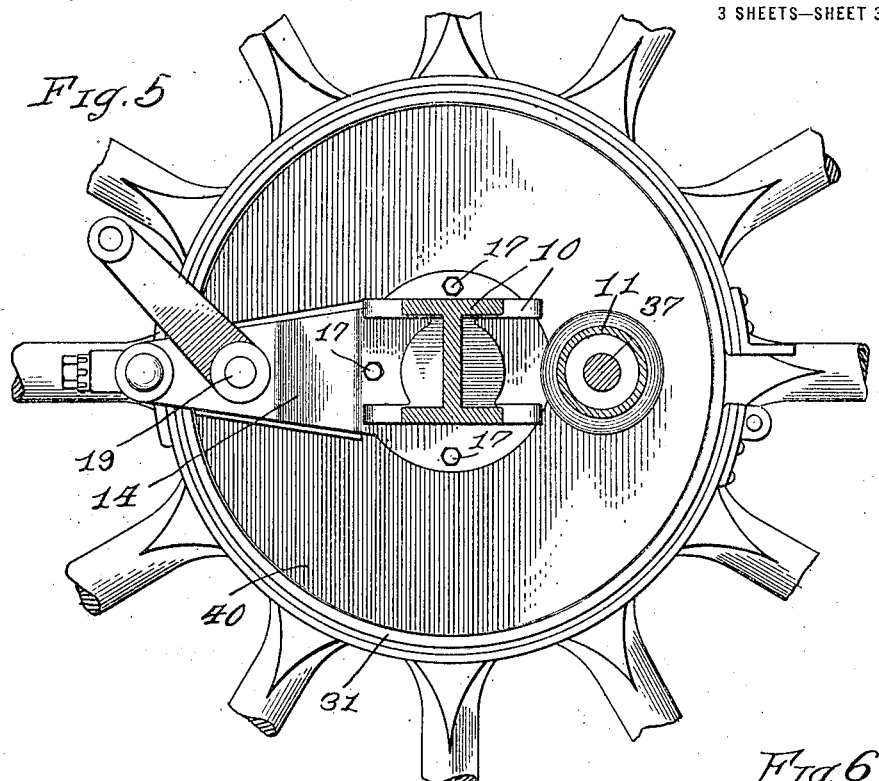
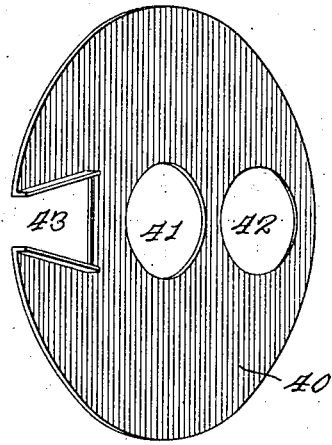
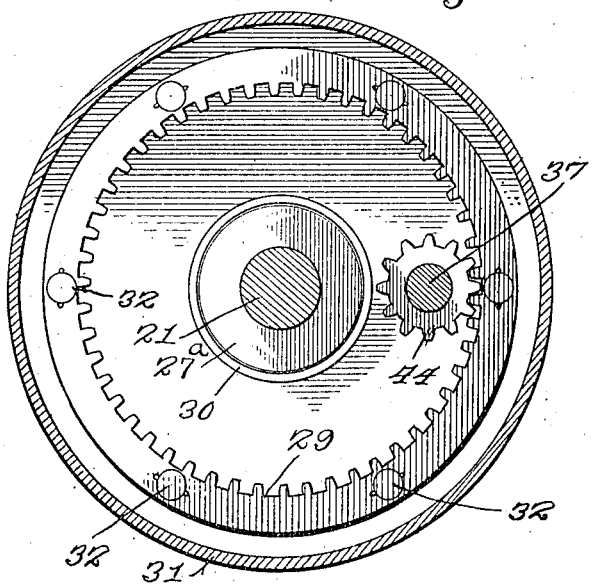
Witnesses:
L. B. Graham
W. A. Furnner.
Inventor:
Robert J. Burrows
By Adams & Jackson
Att'ys.

UNITED STATES PATENT OFFICE.

ROBERT J. BURROWS, OF BUCHANAN, MICHIGAN, ASSIGNOR, BY MESNE ASSIGNMENTS, TO CLARK EQUIPMENT COMPANY, OF BUCHANAN, MICHIGAN, A CORPORATION OF MICHIGAN.

AXLE FOR MOTOR-VEHICLES.

1,291,761.  Specification of Letters Patent. Patented Jan. 21, 1919.

Application filed August 31, 1914. Serial No. 859,429.

*To all whom it may concern:*

Be it known that I, ROBERT J. BURROWS, a citizen of the United States, residing at Buchanan, in the county of Berrien and State of Michigan, have invented certain new and useful Improvements in Axles for Motor-Vehicles, of which the following is a specification, reference being had to the accompanying drawings.

My invention relates to motor vehicle axles, and has for its object to provide an improved axle suitable for application to vehicles of a heavy type, such as motor trucks, etc. The improvements which form the subject-matter of this application have more particularly to do with axles such, for example, as that shown in Letters Patent No. 871,108, granted November 19, 1907, to Adolph Clément, comprising a dead axle-member which carries the wheel spindles, and live axle-members arranged in front of the dead axle member and driven, through the usual differential gearing, from a propeller-shaft operated by the motor, my live axle-members being connected to drive the wheels mounted on the spindles. Such improvements comprise a novel and efficient construction of the axle-members by which the live axle-housing is relieved of excessive strains and consequently may be made of lighter construction, the dead axle being designed not only to carry the wheel spindles with the requisite strength and rigidity, but also to support and brace the live axle-housing so as to hold it rigid and maintain true alinement of the shafts and pinions within it which comprise the live axle; also the combination with the live axle-pinions of a novel arrangement of the gearing by which such pinions operate to drive the wheels, by which such gearing may be readily removed and replaced without disturbing any of the other parts; also an arrangement of such gearing and pinions with relation to the brake drums by which the brake mechanism is entirely separated from the gears, so that the lubricant used on the gears cannot work into the brakes, and such lubricant is properly retained in the gears and dust and mud are kept out of them; also a novel manner of supporting the wheels on the wheel spindles so that radial load is sutained by roller bearings, and end thrust in either direction is sustained by ball bearings.

In the accompanying drawings, which illustrate a practical embodiment of the improvements mentioned,—

Figure 1 is a plan view of my improved axle, the wheels and usual external brakes being omitted;

Fig. 2 is a rear elevation thereof;

Fig. 3 is a central horizontal section of one half of the axle, the wheel being in position on the spindle;

Fig. 4 is a perspective view of the disk or diaphragm that separates the gear chamber from the brake chamber;

Fig. 5 is a cross-section on line 5—5 of Fig. 3;

Fig. 6 is a cross-section on line 6—6 of Fig. 3 showing the gear chamber; and

Fig. 7 is a perspective view of a cover-plate that closes the brake chamber.

In the embodiment of my invention illustrated in the drawings, 10 indicates the dead axle member and 11 tubular members forming the lateral portion of the live axle housing, the central portion 11$^a$ of which contains the usual differential gearing 12 and is made approximately globular in form, as shown in Fig. 1. The members 11 and 11$^a$ of the housing are firmly secured together by bolts or other suitable means, as shown in Fig. 3. The dead axle member 10 is in the form of an I-beam expanded at the center and having an opening there into which the globular portion 11$^a$ projects slightly, as shown in Fig. 1, so that portions of the axle member 10 extend over and under the rear part of the globular portion 11$^a$. These parts are firmly secured together by bolts 13, as shown in Fig. 2. The longitudinal axes of the tubular members 11 of the housing are parallel with that of the axle member 10, the outer end portions of said members being securely held in position by brackets or castings 14 bored to fit upon sleeves 15—16 provided at the end portions of the axle member 10 and housing members 11, respectively, as shown in Fig. 3. These brackets or castings are rigidly secured to the axle member 10 by bolts 17, also shown in Fig. 3. Thus the members 10 and 11 are held in parallelism and cannot get out of alinement. The brackets or castings 14 also serve as supports for the usual external brakes 18 and cam shafts 19 by which the internal brakes 20 are actuated, as illustrated in Fig. 3.

The latter brakes are mounted on the brackets 14, which, as shown at the top of said figure, project under the brake drums.

It will be noted that by arranging and connecting the axle member 10 and housing members 11 and 11ᵃ in the manner described said axle member acts as a truss, to brace and support the housing both against vertical and lateral strains, and consequently the housing may be made comparatively light without danger of its getting out of alinement or breaking down. The projection of the globular portion 11ᵃ of the housing into the central opening in the dead axle member 10 provides for readily assembling the live axle housing with the dead axle, and it permits such slight adjustment of the parts to each other as may be necessary. Nevertheless, when the bolts 13 have been applied, the housing and its contents are strongly supported and prevented from being displaced with reference to the dead axle. It will be apparent that my improved construction provides for applying the live axle housing with its contents to or removing it from the dead axle member as a unit.

21 indicates one of the wheel spindles, which is secured in the sleeve 15 in any suitable way. (It will be understood that both ends of the axle are alike and that the description while directed to one end applies to both). The outer end portion of the spindle 21 is reduced, as shown at 21ᵃ in Fig. 3, and is adapted to receive and carry on such reduced portion a double ball bearing 22 having two sets of balls arranged to sustain end thrust in opposite directions. The ball bearing 22 is fitted in the outer end portion of the hub 23 of the wheel 24, being secured therein by a ring-nut 25, as shown in Fig. 3. When the wheel is in place on the spindle 21, it is held on by the usual nut 26. The ball bearing is then held against endwise movement by the nut 26 and the shoulder formed by reducing the outer end portion of the spindle. The inner end portion of the wheel hub is supported by a roller bearing 27 which fits upon the larger portion of the spindle 21 and is held in position at one side by a disk 27ᵃ fitted in the inner end of the wheel hub but disconnected therefrom, said disk bearing against the adjacent end of the sleeve 15, as shown in Fig. 3. At its other side the roller bearing 27 is held by a spacing sleeve 28 which fits upon the spindle 21 and extends from the roller bearing to the ball bearing 22. It will be observed that the roller bearing 27 carries only radial load while the ball bearing 22 carries the thrust load in both directions. Both the disk 27ᵃ and the spacing sleeve 28 are stationary with the spindle, and as the sleeve 28 is tight between the roller and ball bearings, the roller bearing is compelled to travel between stationary guides and consequently the roller bearing has no tendency to cramp.

29 indicates an internal gear ring carried by a radial flange 30 formed integral with or secured to the wheel hub 23, as shown in Fig. 3; and 31 indicates a brake-drum also carried by the flange 30 and arranged to project over the gear ring 29 at a short distance therefrom. The brake-drum and gear ring are both detachable, being secured to the flange 30 and to the spokes of the wheel 24 by bolts 32, as shown in Fig. 3. They may therefore be readily removed and replaced without disturbing any of the other parts. As shown, the brake-drum is considerably wider than the gear ring, to permit the internal brakes 20 to be placed between the outer edge of the gear ring and the margin of the brake drum. 33 indicates a disk or diaphragm, of metal or other suitable material, which is fitted into the brake drum 31 between the gear ring 29 and the brake 20. Said disk fits tightly in place and is provided at its periphery with a felt or other suitable packing 34 to make a tight closure. It is also provided with holes 35—36, as shown in Fig. 4, for the passage of the hub 14ᵃ of the casting 14, and the live axle member or jack shaft 37, shown in Fig. 3. I thus provide separate chambers 38—39 to contain, respectively, the driving gears and the internal brake mechanism, and consequently the gears are efficiently protected from mud and dust, and the lubricant used is confined in the gear chamber and cannot get into the brake chamber. This construction also serves the purpose of keeping any brake parts, such as springs or nuts, which may come off or break, from falling into the gear-chamber and damaging the gears. The brake chamber 39 is inclosed at its opposite side by a cover-plate 40, best shown in Figs. 3 and 7, which fits into the brake drum, as shown and is held in place by the bolts 17. It is provided with suitable openings 41, 42 and 43 for the passage of such parts as extend through it.

As shown in Figs. 3 and 6, the live axle member or jack-shaft 37 extends from the differential gearing which drives it, through the housing member 11 and sleeve 16 into the gear chamber 38 where it carries a pinion 44 which meshes with the gear ring 29. Thus the wheel is driven. 45ᵃ indicates the inner bearings of the jack-shafts, which, as shown in Fig. 3, are mounted in the central portion 11ᵃ of the housing. The outer end portion of the live axle member or jack-shaft 37 is provided with a roller bearing 45 fitted in the outer portion of the housing member 11, said bearing being held in place at one end by a shoulder formed in the housing member, and at the other end by a washer 46 between said bearing and the pinion 44. Said washer has a felt packing 47 between it and the axle member 37, as shown in Fig. 3, to protect the bearing from dust. A similar washer 48 is also preferably provided at the opposite side of the bearing.

49 indicates the propeller or drive shaft through which power is transmitted from the usual motor. Said shaft extends into the housing member 11ª through a sleeve 49ª connected thereto, as shown in Fig. 3, and carries a pinion 50 which connects with the differential gearing in the usual way. 51 indicates a ball bearing which is fitted in the end of the sleeve 49 and forms a closure therefor as well as a bearing for the shaft. 52 indicates a roller bearing fitted upon the shaft 49 within the sleeve 49ª. 53 indicates a duct leading from the differential gear chamber to the interior of the sleeve 49ª to a reservoir 54 between the bearings 51 and 52, and 55 indicates a return channel adapted to conduct oil from the reservoir 54 back to the housing member 11ª. The gearing running in oil in the gear case or housing, pumps it through duct 53 to the reservoir 54, thus lubricating the bearings 51 and 52. The surplus oil flows back to the gear chamber in the housing member 11ª through channel 55. Thus the bearings of the shaft 49 are given thorough and constant lubrication without the necessity of packing them with grease, or the use of grease cups, both of which are objectionable.

It will be noted that the live axle members, including the differential gearing, the gearing connecting the propeller shaft with the live axle members, the jack-shafts 37, and the bearings of the propeller shaft and the jack-shafts, are all mounted in a unitary housing which may be separately assembled and handled, and may as a whole be applied to or removed from the dead axle member. By this construction none of the operating parts extend through the dead axle member, and the alinement of the several parts of the live axle member with one another is in no way dependent upon such dead axle member, the latter serving merely to brace and support the live axle housing and its contents, and to perform its usual functions of carrying the rear wheels and supporting the body of the vehicle. This unitary assembly of the live axle members and the mountings of all of the parts thereof at the same side of the dead axle is an important feature of my invention.

While I have described with considerable particularity the embodiment of my invention illustrated, I wish it to be understood that I do not restrict myself to the specific construction shown and described, except in so far as the claims are directed to specific details of such construction.

That which I claim as my invention, and desire to secure by Letters Patent, is,—

1. The combination with a dead axle member having wheel spindles, and wheels mounted on said spindles, of gears secured to said wheels, brake-drums secured to said wheels and projecting laterally over and beyond said gears, live axle members having pinions meshing with said gears, brakes coöperating with said brake-drums, and vertical partitions disposed transversely of the axes of the wheels forming chambers for said gears separated laterally from the brakes.

2. The combination with a dead axle member having wheel spindles, and wheels mounted on said spindles, of gears secured to said wheels, brake-drums secured to said wheels and projecting laterally over and beyond said gears, live axle members having pinions meshing with said gears, brakes coöperating with said brake-drums, vertical partitions disposed transversely of the axes of the wheels forming chambers for said gears separated laterally from the brakes, and a housing inclosing said live axle members and braced by said dead axle member.

3. The combination with a dead axle member having wheel spindles, and wheels mounted on said spindles, of internal gears secured to said wheels, brake drums secured to said wheels and projecting over said gears, brakes coöperating with said brake drums, live axle members having pinions meshing with said gears, a housing inclosing said live axle members and braced by said dead axle member, and means forming laterally-separated chambers for said gears and brakes.

4. The combination with a dead axle member having wheel spindles, and wheels mounted on said spindles, of internal gears secured to said wheels, brake drums secured to said wheels and extending over and beyond said gears, brakes coöperating with said brake drums, a vertical partition forming separate chambers for said gears and brakes, live axle members having pinions meshing with said gears, and means supporting said live axle members.

ROBERT J. BURROWS.

Witnesses:
M. McAulin,
Edmund C. Mogford.